(12) United States Patent
Hage (10) Patent No.: US 7,340,949 B1
(45) Date of Patent: Mar. 11, 2008

(54) PRECIPITATION MEASUREMENT DEVICE

(75) Inventor: Frank William Hage, Boulder, CO (US)

(73) Assignee: University Corporation for Atmospheric Research, Boulder, CO (US)

(*) Notice: Subject to any disclaimer, the term of this patent is extended or adjusted under 35 U.S.C. 154(b) by 0 days.

(21) Appl. No.: 11/594,452

(22) Filed: Nov. 8, 2006

(51) Int. Cl.
*G01W 1/00* (2006.01)

(52) U.S. Cl. .............................. 73/170.17; 73/170.19; 73/170.21

(58) Field of Classification Search . 73/170.01–170.28
See application file for complete search history.

(56) References Cited

U.S. PATENT DOCUMENTS 5,644,080 A * 7/1997 Stormbom et al. ...... 73/335.05
6,546,353 B1 * 4/2003 Hallett et al. ............... 702/130
6,751,571 B1 * 6/2004 Hallett et al. ............... 702/130

* cited by examiner

*Primary Examiner*—Edward Lefkowitz
*Assistant Examiner*—Jermaine Jenkins
(74) *Attorney, Agent, or Firm*—The Ollila Law Group LLC (57) ABSTRACT

A precipitation measurement device measures a precipitation rate of falling precipitation. A first probe is exposed to the falling precipitation. A first temperature sensor detects a first probe temperature. A second probe is shielded from the falling precipitation. A second temperature sensor detects a second probe temperature. A heating element heats the first probe and the second probe when turned on, but not when turned off. After being heated and when the heating element is turned off, the first probe cools at a first temperature drop rate, and the second probe cools at a second temperature drop rate. Circuitry processes a difference between the first temperature drop rate and the second temperature drop rate to determine the precipitation rate of the falling precipitation.

20 Claims, 7 Drawing Sheets

PRECIPITATION MEASUREMENT DEVICE

BACKGROUND OF THE INVENTION

1. Field of the Invention

The invention is related to the field of weather technology, and in particular, to precipitation measurement devices.

2. Statement of the Problem

Some existing precipitation gauges maintain two heated plates at the same constant high-temperature. The two plates are exposed to the same ambient temperature and wind, but only one of the plates is exposed to falling precipitation. The other plate is shielded from the falling precipitation. Thus, the plate that is exposed to falling precipitation requires more power to evaporate the falling precipitation and maintain the constant temperature. Thus, the power differential between the two plates correlates to the precipitation rate.

In practice, these heated precipitation gauges may require an expensive power switch and complex feedback loop to maintain the plates at the high constant temperature. The feedback loop may turn the heat on and off many times a second, so the actual plate temperature may not properly converge on the desired constant temperature. Instead, the actual plate temperature may oscillate around the desired constant temperature. This oscillation causes a loss of sensitivity and may lead to instability during a significant precipitation event.

The rapid on/off switching may require a large and stable power supply. The power supply must constantly provide power, since both plates are continuously maintained at the high temperature. Thus, the heated precipitation gauges may require expensive power supplies that must continuously provide power. This continuous power consumption adds additional cost.

In addition, some precipitation tends to bounce off of the exposed plate instead of collecting on the plate. The precipitation that bounces off the exposed plate does not effectively cool the plate, so minimal power is consumed by precipitation that bounces off the plate. The power consumption is correlated to the precipitation rate, so a power consumption measurement that is incorrectly low due to bouncing precipitation causes the resulting precipitation rate measurement to be incorrectly low as well.

SUMMARY OF THE SOLUTION

An example of the invention includes a precipitation measurement device to measure a precipitation rate of falling precipitation. The precipitation measurement device is configured and operates as follows. A first probe is exposed to the falling precipitation. A first temperature sensor detects a first probe temperature. A second probe is shielded from the falling precipitation. A second temperature sensor detects a second probe temperature. A heating element heats the first probe and the second probe when turned on, and does not heat the first probe and the second probe when turned off. After being heated and when the heating element is turned off, the first probe cools at a first temperature drop rate, and the second probe cools at a second temperature drop rate. Circuitry processes a difference between the first temperature drop rate and the second temperature drop rate to determine the precipitation rate of the falling precipitation.

In some examples of the invention, a relay turns the heating element on and off.

In some examples of the invention, a relay turns the heating element on when the first probe temperature reaches a minimum temperature and turns the heating element off when the first probe temperature reaches a maximum temperature.

In some examples of the invention, the circuitry processes the first probe temperature to determine the first temperature drop rate and processes the second probe temperature to determine the second temperature drop rate.

In some examples of the invention, the circuitry processes the first probe temperature and the second probe temperature to determine the difference between first temperature drop rate and the second temperature drop rate.

In some examples of the invention, the first probe comprises a first metal toroid, and the second probe comprises a second metal toroid positioned under the first metal toroid with respect to the falling precipitation.

In some examples of the invention, the first probe and the second probe each comprise a toroid having a convex shape.

In some examples of the invention, the first probe comprises a first metal plate and the second probe comprises a second metal plate positioned under the first metal plate with respect to the falling precipitation.

In some examples of the invention, a surface of the first probe includes a hydrophobic base that holds one of: hydrophilic ridges and hydrophilic blocks.

In some examples of the invention, a surface of the first probe includes a hydrophobic base that holds one of: hydrophilic cylinders and hydrophilic orbs.

DESCRIPTION OF THE DRAWINGS

The same reference number represents the same element on all drawings.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below for the various examples can be combined in various ways to form multiple variations of the invention. As a result, the invention is not limited to the specific examples described below, but only by the claims and their equivalents.

Precipitation Measurement Device

Example #1

Figure 1:
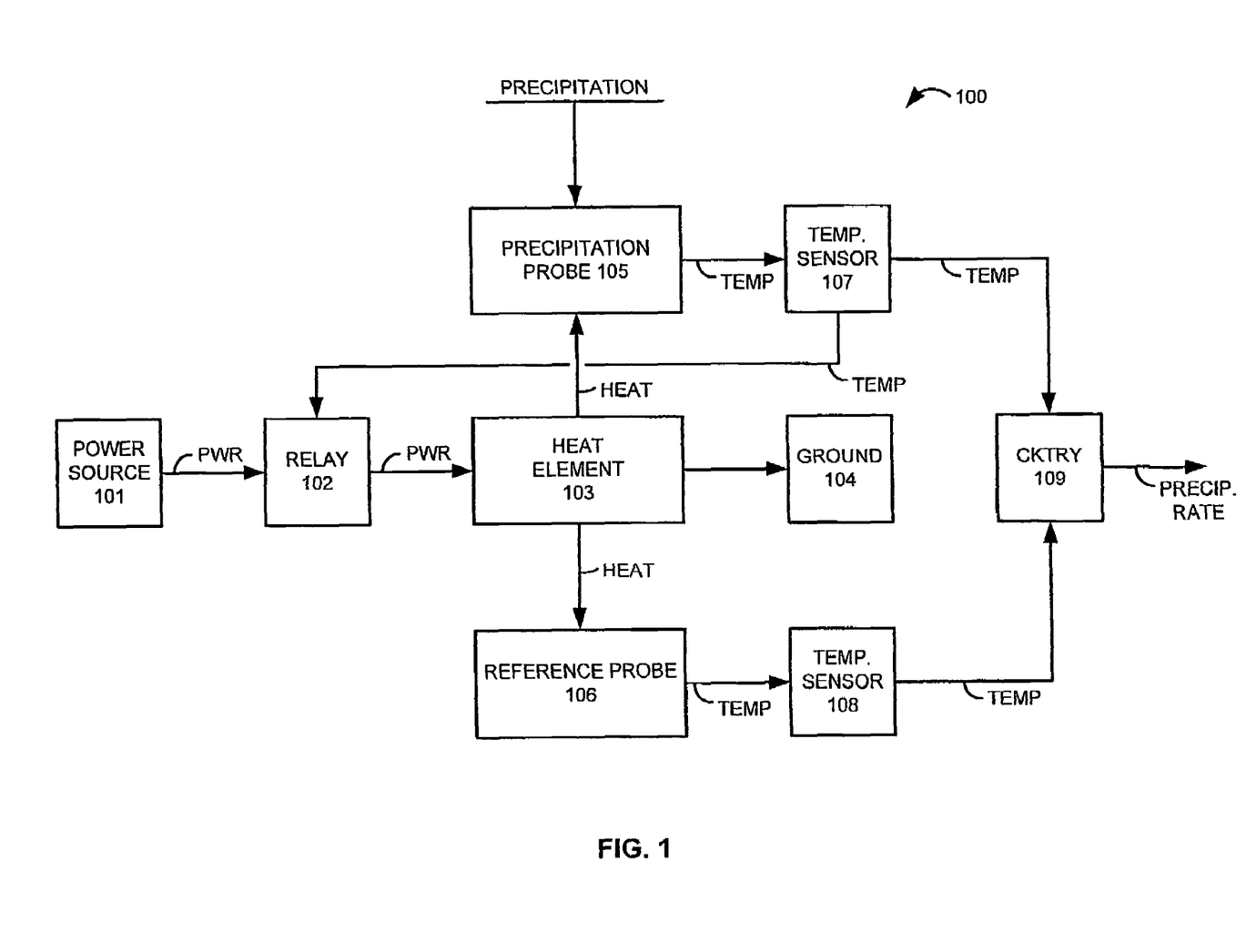
FIG. 1 illustrates a schematic for a precipitation measurement device in an example of the invention.

FIG. 1 illustrates a schematic for precipitation measurement device 100 in an example of the invention. Precipitation measurement device 100 includes: power source 101, relay 102, heating element 103, ground 104, precipitation probe 105, reference probe 106, temperature sensors 107-108, and circuitry 109. Power source 101 supplies power to relay 102. Relay 102 transfers the power to heating element 103 when the relay is closed, but relay 102 does not transfer the power when the relay is open. Relay 102 opens and closes in response to a temperature signal from temperature sensor 107. Heating element 103 converts the power into heat energy and transfers equal amounts of the heat energy to probes 105 and 106. Heating element 103 transfers the remaining current to ground 104 to complete the electrical circuit from power source 101. Note that the temperature signal from temperature sensor 107 controls the heating and cooling of probes 105-106.

Probes 105-106 are thermal conductors that typically have the same composition and configuration. Probes 105-106 could be composed of a metal, such as aluminum or copper, or they could be composed of another suitable thermal conducting material. Probes 105-106 could be configured as toroids, discs, plates, or other shapes that are suitable to collect falling precipitation.

Precipitation probe 105 is exposed to falling precipitation that cools probe 105. Probe 106 is not exposed to falling precipitation, and thus, is not cooled like precipitation probe 105. Precipitation probe 105 may be positioned above reference probe 106 to shield reference probe 106 from the falling precipitation. This orientation may be adjusted for blowing precipitation that does not fall vertically, so that precipitation probe 105 shields reference probe 106 from the blowing, non-vertical precipitation. If desired, a matrix of probe pairs could each be positioned at a different orientation, so that at least one of the probe pairs has an exposed probe and a shielded probe given the current direction of the falling precipitation.

Temperature sensor 107 detects the temperature of precipitation probe 105 and transfers signals indicating this temperature to relay 102 and circuitry 109. Temperature sensor 108 detects the temperature of reference probe 105 and transfers a signal indicating this temperature to circuitry 109. Circuitry 109 processes the temperature signals from temperature sensors 107-108 to determine the rate of the precipitation that is falling on precipitation probe 105. The precipitation rate could be provided in grams per square meter per hour, grams per square decimeter per hour, or some other precipitation rate metric.

Figure 2:
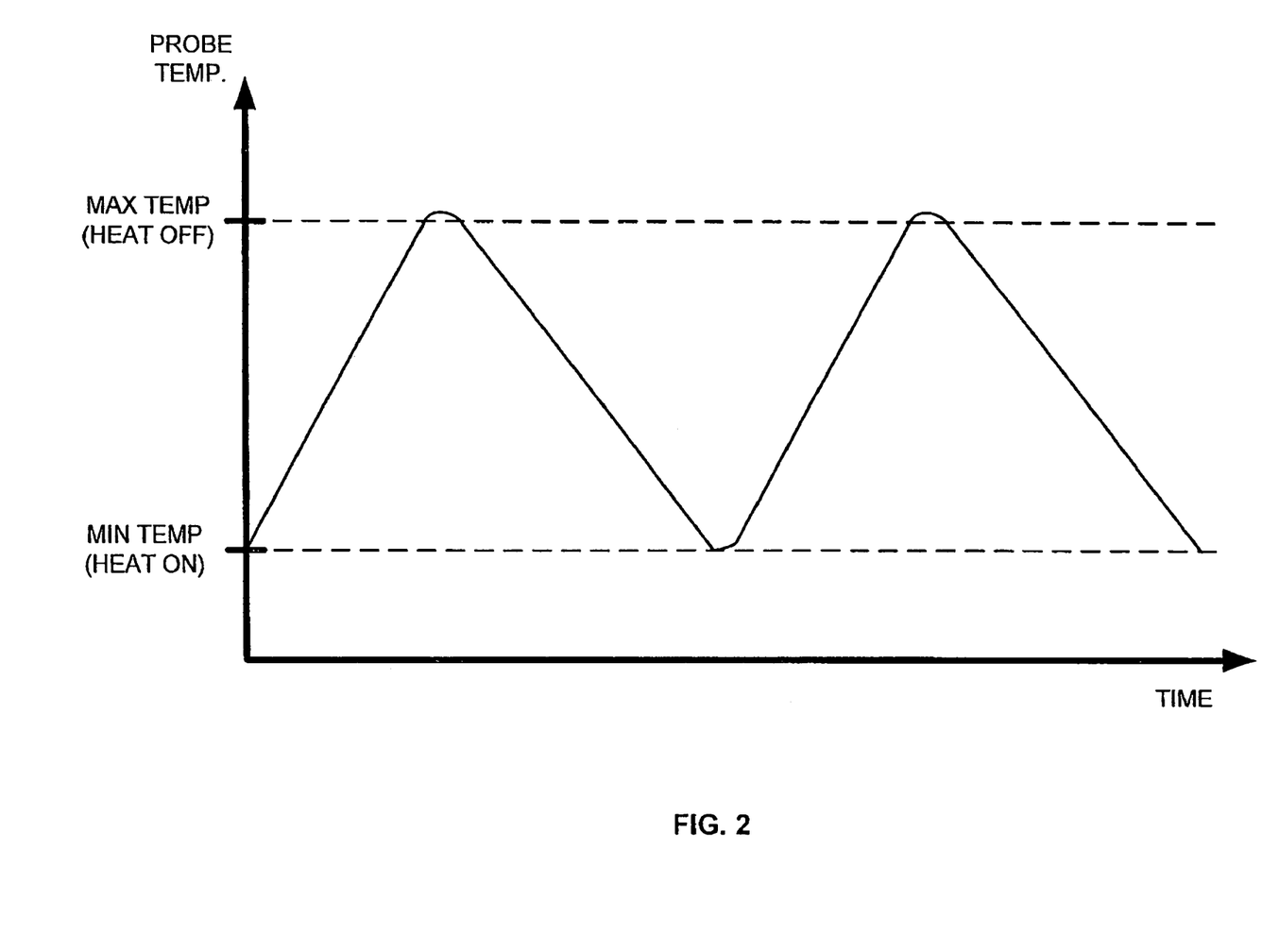
FIG. 2 illustrates the heating duty cycle for a precipitation probe 105 in an example of the invention.

FIG. 2 illustrates the heating duty cycle for precipitation probe 105 in an example of the invention. The vertical axis indicates the temperature of precipitation probe 105 as indicated by temperature sensor 107. The horizontal axis indicates time. Note the maximum and minimum temperatures for the precipitation probe 105 that are marked on the vertical axis. The maximum temperature could be 400° F. and the minimum temperature could be 200° F., although other suitable temperatures could be used. When the temperature of precipitation probe 105 reaches the maximum temperature, relay 102 opens to turn off heating element 103. For a short time after heating element 103 turns off, the temperature of precipitation probe 105 will continue to rise, but the temperature soon starts to fall due to environmental conditions including any falling precipitation. When the temperature of precipitation probe 105 reaches the minimum temperature, relay 102 closes to turn on heating element 103. The temperature of precipitation probe 105 starts to rise to the maximum temperature, and the process repeats. Aside from the effects of falling precipitation and solar radiation, the heating duty cycle for reference probe 106 should be substantially the same.

Figure 3:
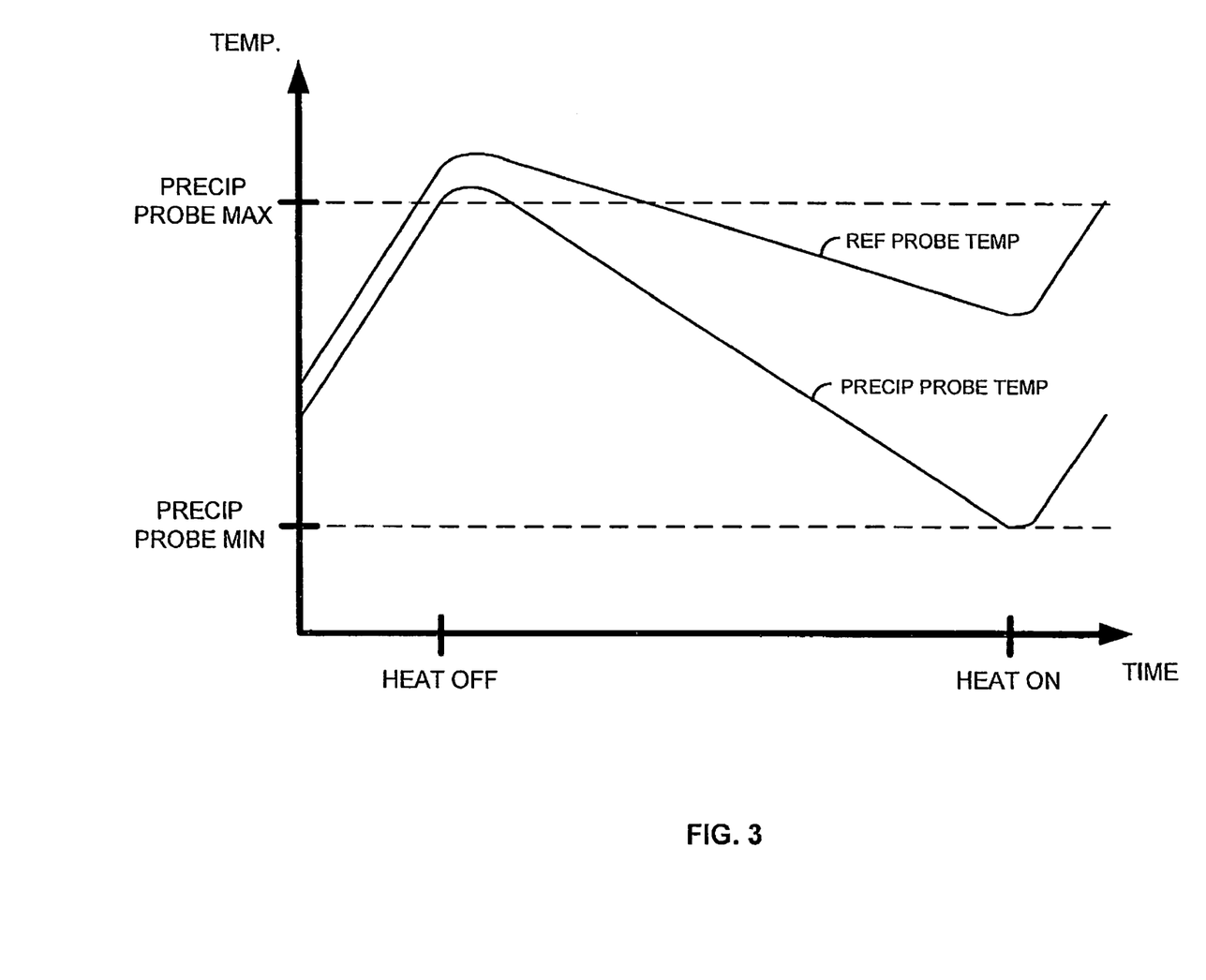
FIG. 3 illustrates comparative temperatures for probes during a precipitation event in an example of the invention.

FIG. 3 illustrates comparative temperatures for probes 105-106 during a precipitation event in an example of the invention. The vertical axis indicates temperature, and the horizontal axis indicates time. Note the maximum and minimum temperatures for the precipitation probe 105 that are marked on the vertical axis. Note the time points where heating element 103 turns off and on that are noted on the horizontal axis. During a precipitation event, the falling precipitation cools exposed precipitation probe 105, but does not cool shielded reference probe 106. Due to the cooling effects of the precipitation, the temperature of precipitation probe 105 drops faster than the temperature of reference probe 106. Other environmental conditions, such as ambient temperature, wind, and black body radiation, should have substantially equal effects on both probes 105-106, so the difference in the rate of temperature drop can be attributed to the falling precipitation.

Circuitry 109 processes the signals from temperature sensors 107-108 to determine the rate of the temperature drop for each probe, and then subtracts one rate from the other to obtain the difference in the rates. This difference in temperature drop rates can be attributed to the falling precipitation. For example, precipitation probe 105 may drop by 10° F. per second due to environmental conditions that include falling precipitation, whereas reference probe 106 may drop by 6° F. per second due to environmental conditions that do not include falling precipitation. Thus, the rate of temperature drop due to the falling precipitation is 4° F. per second.

Although other techniques could be used, circuitry 109 converts the rate of the temperature drop due to the falling precipitation into the rate of the falling precipitation based on the following equation:

$$\text{Precipitation Rate} = aR^b + c; \text{ where}$$

R is the rate of temperature drop due to the falling precipitation; and a, b, and c are coefficients that are determined through empirical testing.

In order to facilitate the empirical testing, the coefficients can be first estimated with calculations that use the heat capacity of the probes to convert the difference in temperature drop rates to a caloric difference over time, and then to convert the caloric difference over time into a mass of precipitation over time and area.

In an alternative example of the invention, circuitry 109 could process its temperature signal from temperature sensor 107 to directly control relay 102 (or a suitable replacement switch) in accord with the above duty cycle. Another alternative would be for circuitry 109 to provide a temperature signal to relay 102. In either alternative, the data path between temperature sensor 107 and relay 102 would be replaced with a data path between circuitry 109 and relay 102.

In an alternative example of the invention, heating element 103 could be comprised of two separate heating elements, so each probe had its own heating element. Both heating elements could be driven by relay 102. If desired, separate relay control and feedback circuits could be used for the separate heating elements.

Temperature sensors 107-108 could be mechanically mounted the surface of probes 105-106 and could use thermal conduction to measure temperature. In an alternative example of the invention, temperature sensors 107-108 could comprise devices that detect electromagnetic Infra-Red (IR) emissions. These IR devices could be properly positioned to detect the IR emissions from the probes, and process these emissions to determine probe temperatures. A Fresnel lens may be placed between the probe and the IR device to maximize the area of the probe that is observed by the IR device.

Precipitation Measurement Device

Example #2

Figure 4:
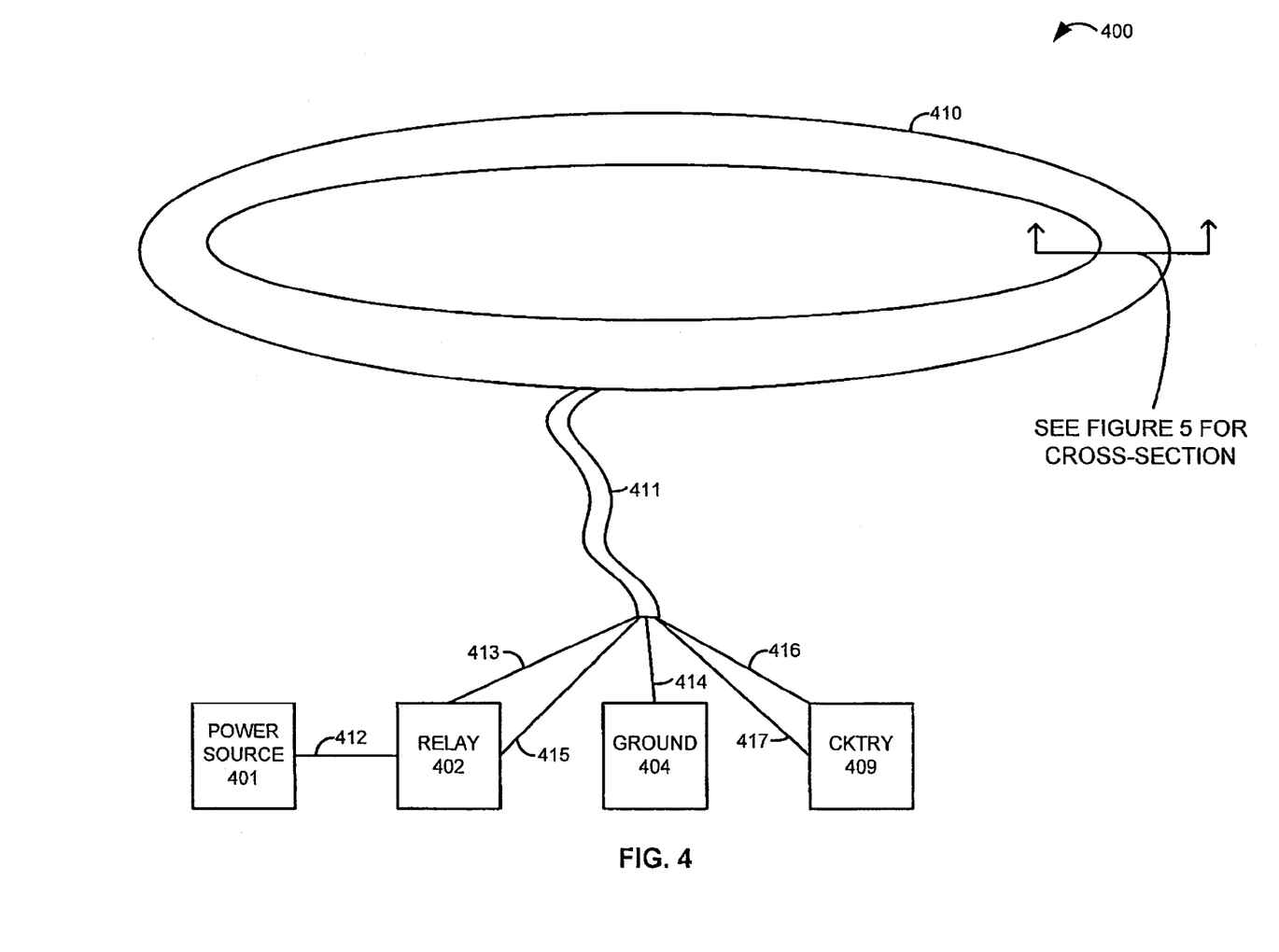
FIG. 4 illustrates a configuration for a precipitation measurement device in an example of the invention.

FIG. 4 illustrates a configuration for precipitation measurement device 400 in an example of the invention. Precipitation measurement device 400 includes power source 401, relay 402, ground 404, circuitry 409, probe assembly 410, and wiring 411-412. Wiring 411 includes power lines 413-414 and data lines 415-417. Circuitry 409 could comprise a programmed computer microprocessor, logic circuit, or some other processing device. Circuitry 409 may be distributed among multiple processing devices.

Figure 5:
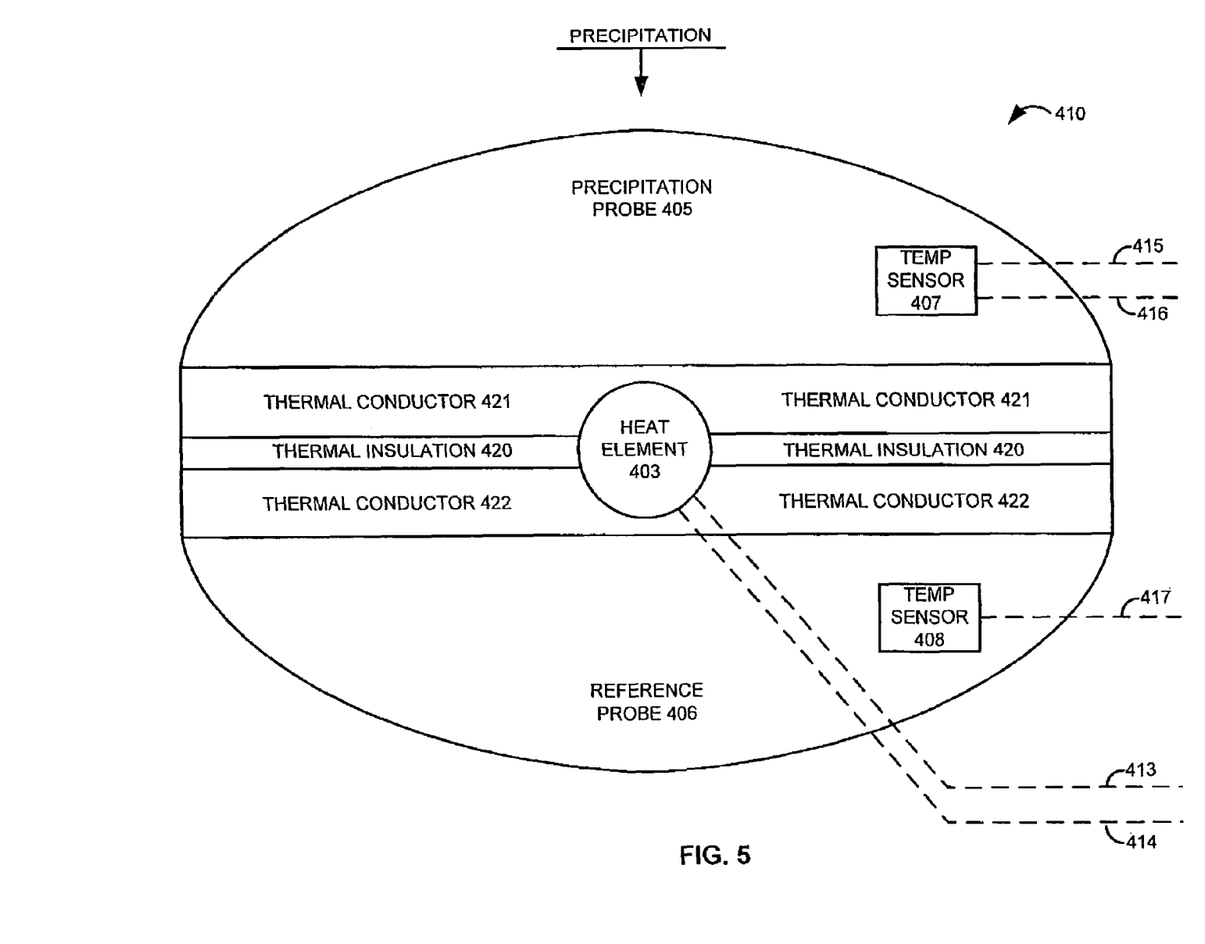
FIG. 5 illustrates a cross-section of a probe assembly in an example of the invention.

FIG. 5 illustrates a cross-section of probe assembly 410 in an example of the invention. Probe assembly 410 includes heating element 403, precipitation probe 405, reference probe 406, temperature sensors 407-408, thermal insulation 420, and thermal conductors 421-422. Heating element could be a round ceramic heating line. Probes 405 and 406 could be metal toroids having the same size and shape. Thermal insulation 420 is a material, such as Styrofoam, that effectively prevents heat transfer between thermal conductor 421 and thermal conductor 422. Thermal conductors 421-422 could be comprised of metal, such as copper or aluminum. Note that probes 405-406 have a convex shape, but they could use a concave shape or some other shape in other examples.

Referring to FIGS. 4-5, power source 401 supplies power to relay 402 over wiring 412. When closed, relay 402 transfers power to heating element 403 over power line 413. When open, relay 402 does not transfer power. Relay 402 opens and closes in response to a temperature signal from temperature sensor 407 over data line 415 in a similar manner to that described above for relay 102. Heating element 403 converts the power into heat energy and transfers equal amounts of the heat energy through thermal conductors 421-422 to probes 405-406. Thermal insulation 420 effectively inhibits thermal energy transfer between probes 405-406. Heating element 403 transfers the remaining current to ground 404 over power line 414 to complete the electrical circuit from power source 401.

Precipitation probe 405 is exposed to falling precipitation that cools probe 405. Precipitation probe 405 is positioned above reference probe 406 to shield reference probe 406 from the falling precipitation. Thus, reference probe 406 is not cooled by falling precipitation like precipitation probe 405. Temperature sensor 407 detects the temperature of precipitation probe 405 and transfers signals indicating this temperature to relay 402 and circuitry 409 over data lines 415-416. Temperature sensor 408 detects the temperature of reference probe 406 and transfers a signal indicating this temperature to circuitry 409 over data line 417. In a similar manner to circuitry 109, circuitry 409 processes the temperature signals from temperature sensors 407-408 to determine the rate of the precipitation falling on precipitation probe 405.

Probe Surfaces

Figure 6:
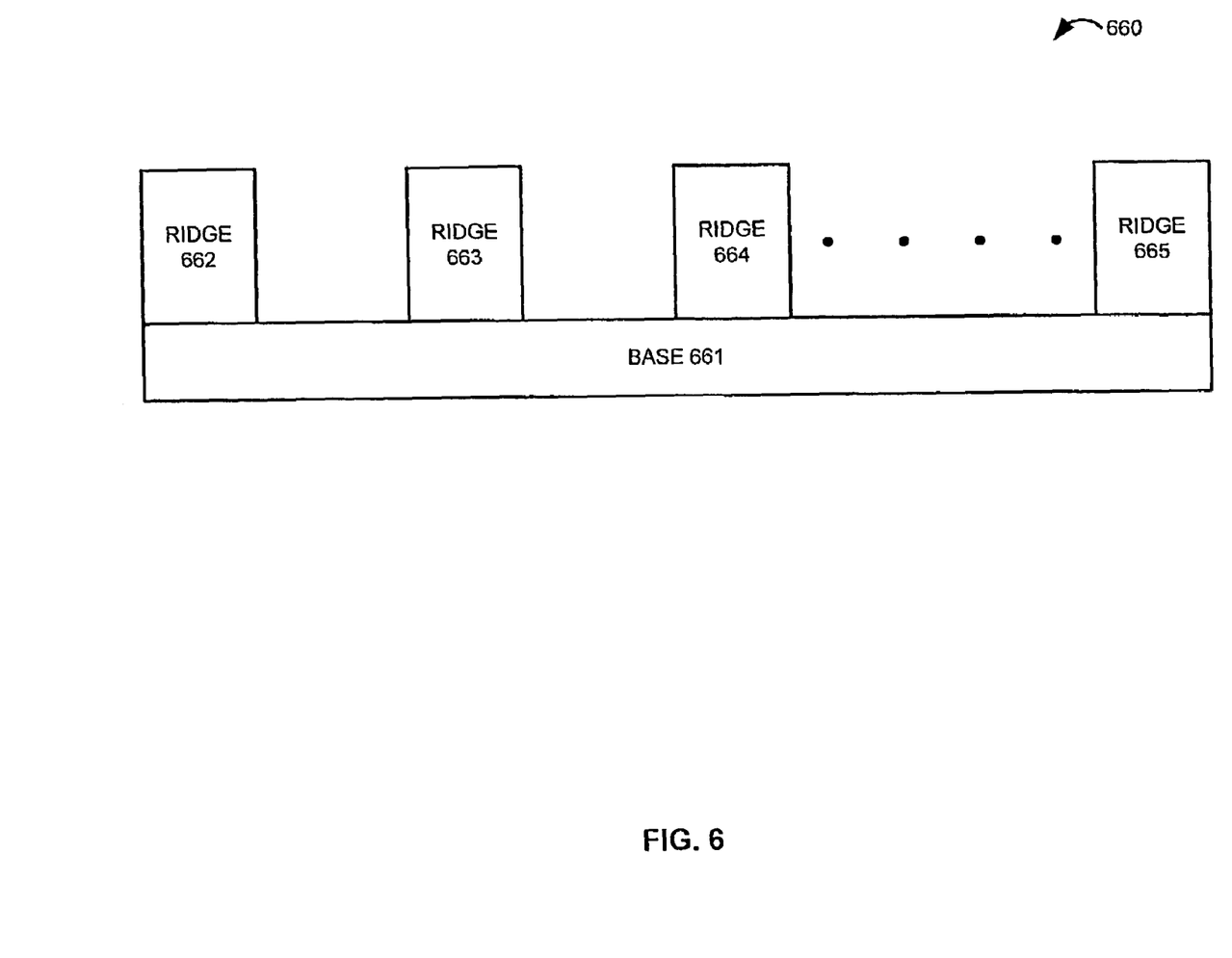
FIG. 6 illustrates a surface configuration for probes in an example of the invention.

FIG. 6 illustrates a surface configuration 660 for probes in an example of the invention. Probe surface 660 includes base 661 and ridges 662-665 that extend from base 661. Ridges 662-665 are comprised or coated with a hydrophilic material that attracts water. Base 661 is comprised or coated with a hydrophobic material that repels water. Thus, surface configuration 660 is comprised of hydrophilic ridges and hydrophobic valleys. The ridged surface of the probes is highly attractive to water molecules, and capillary action drives the water molecules to base 661, where thermal contact between the precipitation and probe surface 660 is best. This combined use of hydrophilic and hydrophobic surfaces should reduce the amount of precipitation that bounces off of the exposed probe to improve the accuracy of the precipitation measurement.

Surface configuration 660 is configured at the micron level, so the dimensions and spacing of ridges 662-665 could be measured in microns. Only four ridges are shown for clarity, but a multitude of ridges may be present. In addition, additional ridges could be added that are perpendicular to ridges 662-665 to form a cross-hatched surface. Concentric ridges could be used. Also, ridges 662-665 could be replaced with pillars or block-shaped bumps that are spaced on base 661 in a tightly-packed grid configuration.

Figure 7:
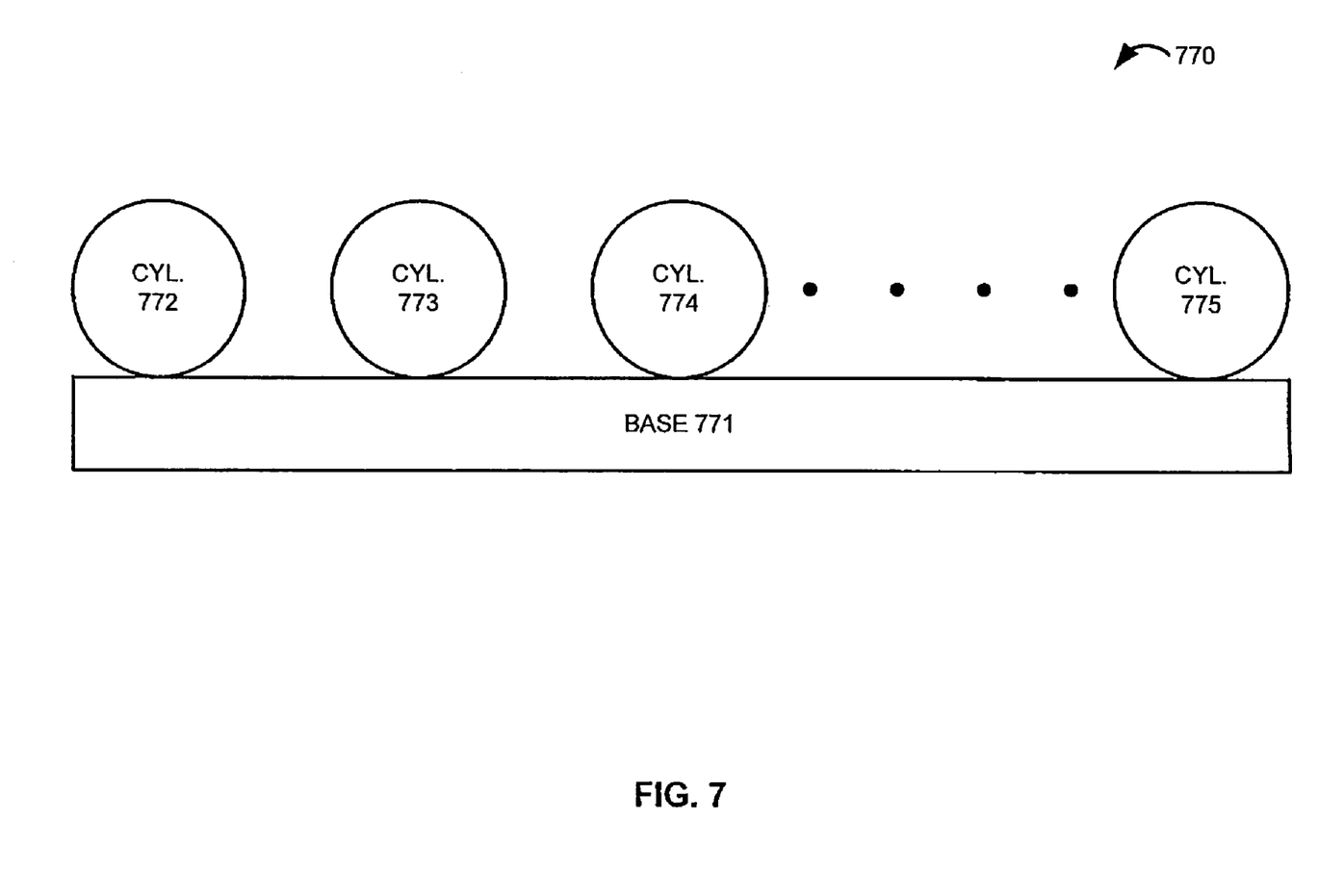
FIG. 7 illustrates a surface configuration for probes in an example of the invention.

FIG. 7 illustrates a surface configuration 770 for probes in an example of the invention. Probe surface 770 includes base 771 and cylinders 772-775 that extend from base 761. Cylinders 772-775 are comprised or coated with a hydrophilic material that attracts water. Base 661 is comprised or coated with a hydrophobic material that repels water. Water molecules in the falling precipitation are attracted by cylinders 772-775 and repelled by base 771. Thus, the water molecules are drawn down cylinders 772-775 and trapped near base 771 causing probe surface 770 to collect the falling precipitation. This combined use of hydrophilic and hydrophobic surfaces should reduce the amount of precipitation that bounces off of the exposed probe to improve the accuracy of the precipitation measurement.

Surface configuration 770 is configured at the micron level, so the dimensions and spacing of cylinders 772-775 could be measured in microns. Only four cylinders are shown for clarity, but a multitude of cylinders may be present. In addition, additional cylinders could be added that are perpendicular to cylinders 772-775 to form a cross-hatched surface. Concentric cylinders could be used. Also, cylinders 772-775 could be replaced with spheres or orb-shaped bumps that are spaced on base 771 in a tightly-packed grid configuration.

Additional technical information related to heated precipitation measurement devices are given in U.S. Pat. No. 6,546,353; which is hereby incorporated by reference into this patent application.

Advantages

The precipitation measurement device described above uses temperature data obtained during a passive cooling phase to determine the precipitation rate. As a result, the precipitation measurement device avoids the need to continuously maintain two plates at a high constant temperature. Thus, the precipitation measurement device can eliminate the need for the expensive power switch, complex feedback loop, and large power supply. The accuracy and stability of the precipitation measurement device is improved by avoiding plate-temperature oscillation around the high constant temperature. The precipitation measurement device can also consume less power to further reduce costs. In addition, the combined used of hydrophobic and hydrophilic probe surfaces can reduce the amount of precipitation that bounces of the exposed probe to improve the accuracy of the precipitation measurement.

The invention claimed is:

1. A precipitation measurement device to measure a precipitation rate of falling precipitation, the precipitation measurement device comprising:
   a first probe configured to be exposed to the falling precipitation;
   a first temperature sensor configured to detect a first probe temperature;
   a second probe configured to be shielded from the falling precipitation;
   a second temperature sensor configured to detect a second probe temperature;
   a heating element configured to heat the first probe and the second probe when turned on and not to heat the first probe and the second probe when turned off;
   wherein after being heated and when the heating element is turned off, the first probe cools at a first temperature drop rate and the second probe cools at a second temperature drop rate; and
   circuitry configured to process a difference between the first temperature drop rate and the second temperature drop rate to determine the precipitation rate of the falling precipitation.

2. The precipitation measurement device of claim 1 further comprising a relay configured to turn the heating element on and off.

3. The precipitation measurement device of claim 1 further comprising a relay configured to turn the heating element on when the first probe temperature reaches a minimum temperature and to turn the heating element off when the first probe temperature reaches a maximum temperature.

4. The precipitation measurement device of claim 1 wherein the circuitry is configured to process the first probe temperature to determine the first temperature drop rate and to process the second probe temperature to determine the second temperature drop rate.

5. The precipitation measurement device of claim 1 wherein the circuitry is configured to process the first probe temperature and the second probe temperature to determine the difference between first temperature drop rate and the second temperature drop rate.

6. The precipitation measurement device of claim 1 wherein the first probe comprises a first metal toroid and the second probe comprises a second metal toroid positioned under the first metal toroid with respect to the falling precipitation.

7. The precipitation measurement device of claim 1 wherein the first probe and the second probe each comprise a toroid having a convex shape.

8. The precipitation measurement device of claim 1 wherein the first probe comprises a first metal plate and the second probe comprises a second metal plate positioned under the first metal plate with respect to the falling precipitation.

9. The precipitation measurement device of claim 1 wherein a surface of the first probe includes a hydrophobic base that holds one of: hydrophilic ridges and hydrophilic blocks.

10. The precipitation measurement device of claim 1 wherein a surface of the first probe includes a hydrophobic base that holds one of: hydrophilic cylinders and hydrophilic orbs.

11. A method of operating, a precipitation measurement device to measure a precipitation rate of falling precipitation, the method comprising:
    exposing a first probe to the falling precipitation and detecting a first probe temperature;
    shielding a second probe from the falling precipitation and detecting a second probe temperature;
    turning on a heating element to heat the first probe and the second probe and turning off the heating element to not heat the first probe and the second probe;
    wherein after being heated and when the heating element is turned off, the first probe cools at a first temperature drop rate and the second probe cools at a second temperature drop rate; and
    processing a difference between the first temperature drop rate and the second temperature drop rate to determine the precipitation rate of the falling precipitation.

12. The method of claim 11 further comprising using a relay to turn the heating element on and off.

13. The method of claim 11 further comprising using a relay to turn the heating element on when the first probe temperature reaches a minimum temperature and to turn the heating element off when the first probe temperature reaches a maximum temperature.

14. The method of claim 11 wherein processing a difference between the first temperature drop rate and the second temperature drop rate to determine the precipitation rate of the falling precipitation comprises processing the first probe temperature to determine the first temperature drop rate and processing the second probe temperature to determine the second temperature drop rate.

15. The method of claim 11 wherein processing a difference between the first temperature drop rate and the second temperature drop rate to determine the precipitation rate of the falling precipitation comprises processing the first probe temperature and the second probe temperature to determine the difference between first temperature drop rate and the second temperature drop rate.

16. The method of claim 11 wherein the first probe comprises a first metal toroid and the second probe comprises a second metal toroid positioned under the first metal toroid with respect to the falling precipitation.

17. The method of claim 11 wherein the first probe and the second probe each comprise a toroid having a convex shape.

18. The method of claim 11 wherein the first probe comprises a first metal plate and the second probe comprises a second metal plate positioned under the first metal plate with respect to the falling precipitation.

19. The method of claim 11 wherein a surface of the first probe includes a hydrophobic base that holds one of: hydrophilic ridges and hydrophilic blocks.

20. The method of claim 11 wherein a surface of the first probe includes a hydrophobic base that holds one of: hydrophilic cylinders and hydrophilic orbs.

* * * * *